Dec. 8, 1936.  H. R. TEAR  2,063,409
LUBRICATING DEVICE
Filed July 14, 1934  2 Sheets-Sheet 1

INVENTOR.
HARRY R. TEAR.
BY John A. Watson
ATTORNEY

Dec. 8, 1936.   H. R. TEAR   2,063,409
LUBRICATING DEVICE
Filed July 14, 1934    2 Sheets-Sheet 2

INVENTOR
HARRY R. TEAR.
BY
ATTORNEY

Patented Dec. 8, 1936

2,063,409

UNITED STATES PATENT OFFICE 2,063,409

LUBRICATING DEVICE

Harry R. Tear, Evanston, Ill., assignor to The Lubrication Corporation, South Bend, Ind., a corporation of Delaware Application July 14, 1934, Serial No. 735,193

11 Claims. (Cl. 221—47.3)

This invention relates to improvements in lubricating devices, and more particularly to lubricant cartridge connecting means for establishing lubricant tight connections between lubricant guns, dispensers or the like, and interchangeable lubricant cartridges therefor.

An object of my invention is to provide an improved lubricant cartridge connecting means for use in establishing fluid connection between the inlet of a lubricant gun, dispenser or similar apparatus and interchangeable lubricant cartridges therefor wherein lubricant cartridges other than those particularly designed and intended for use with the gun dispenser or the like are incapable of having sealing engagement therewith.

The present invention represents an improvement over the devices illustrated in my copending application Serial No. 647,011 filed on December 13, 1932, in that the cartridge engaging surface of the cartridge connecting means, while cut away to a greater extent than disclosed in the said application provides for the disposition of the zone of contact between cartridge and stud in closer approximation to zone contact in a plane normal to the longitudinal axis of the stud and the direction of thrust between cartridge and stud and hence greater uniformity of contact throughout the cooperating contacting surfaces.

Other objects, the advantages, and uses of the invention will be, or should become apparent after reading the following description and claims and after consideration of the accompanying drawings in which:

Figure 1:
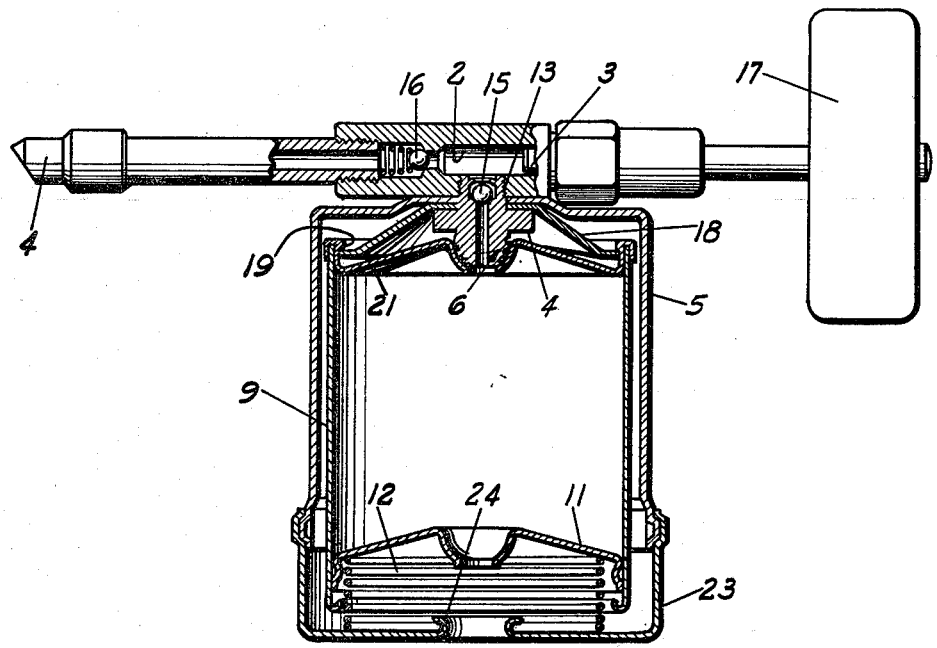
Fig. 1 is a sectional view of a hand lubricant gun equipped with a cartridge connector stud and cartridge constructed in accordance with the invention.

In general the apparatus selected for illustration herein, embodying my improved cartridge connector stud comprises, a hand lubricant gun having a pump cylinder 2, a manually operable piston 3, a discharge nozzle 4, a cartridge housing 5, a cartridge connector stud 6, through which lubricant may be admitted to the cylinder 2, adapted for sealing engagement with the wall 7 of the outlet opening 8 of an interchangeable lubricant cartridge 9 when admitted within the housing 5, a piston 11 forming a movable end closure for the remote end of the cartridge 9, and a compression spring 12 bearing upon the piston 11 to place the lubricant contents of the cartridge under slight pressure thereby to assure the passage of lubricant from the cartridge through the stud 6 and into the gun cylinder 2.

Figure 2:
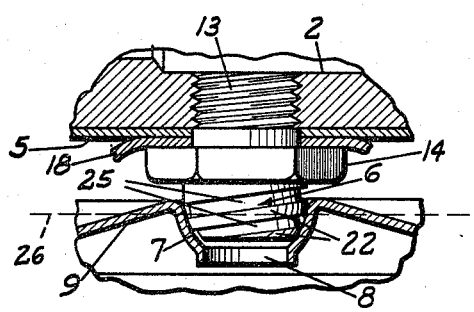
Fig. 2 is an enlarged fragmentary sectional view of the connector stud and cartridge structure of Fig. 1.

Referring particularly to Figs. 1 and 2, the cartridge connector stud 6 may be provided with an externally threaded shank 13 and an intermediate polygonal walled flange portion 14 separating the shank 13 from the head or cartridge engaging portion of the stud. An inlet check valve 15 may be located within the bore of the shank 13 and adapted to cooperate with an outlet check valve 16 for the pump cylinder 2 to cause the withdrawal of lubricant from the cartridge 9 during each retractile stroke of the gun piston 3, as by manipulation of the hand grip 17 therefor, and the discharge of lubricant from the cylinder 2 through the nozzle 4 upon each pressure stroke of the piston.

The flange portion 14 of the stud, cooperating with the threaded shank 13, may serve as a means for securing the housing 5 and a cartridge connector plate 18 to the body of the gun as illustrated in Fig. 1, the housing and plate being interposed between the flange 14 and the adjacent gun body prior to turning the threaded shank 13 into place therein. The cartridge connector plate 18 is adapted for mechanical engagement with the forward end of the cartridge 9, as through the medium of bayonet lugs 19 on the cartridge end wall, engageable with the plate 18 whereby the head, or end closure 21, of the cartridge may be drawn into close engagement with the connector stud 6 to effect a sealing engagement between the wall 7 of the outlet opening 8 of the cartridge and the cartridge engaging surfaces 22 of the stud. A detachable cap 23 may be provided for the outer end of the housing 5 and the compression spring 12 secured thereto as shown at 24.

With reference to Fig. 2, the cartridge engaging surfaces 22 of the connector stud represent zones of a sphere which may be formed by the provision of spaced apart and parallel grooves 25 formed in the outer spherical surface of the head of the stud. The grooves 25 are preferably inclined substantially eight and one-half degrees from a plane normal to the longitudinal axis of the stud and are spaced a distance apart from one another such as to cause any plane normal to the axis of the stud which passes through any of the zones or surfaces 22 of spherical contact also to intercept at least one of the grooves 25 as indicated in dotted lines at 26. This arrangement assures complete engagement of at least one of the spherical zones of contact 22 of the stud with the inner spherical wall 7 of the cartridge outlet opening 8 thereby to provide an adequate fluid tight seal between the cartridge and the connector stud and hence between the cartridge and the lubricant gun cylinder 2.

Figure 3:
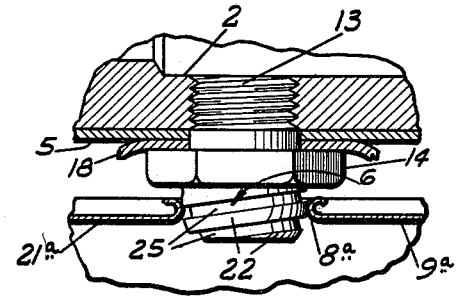
Figs. 3 and 4 are views similar to Fig. 2 illustrating the attempted application to the connector stud of cartridges other than those specifically designed therefor; and, Figs. 5 to 7 inclusive are views similar to Fig. 2 of other forms of the cartridge connecting means.
Figure 4:
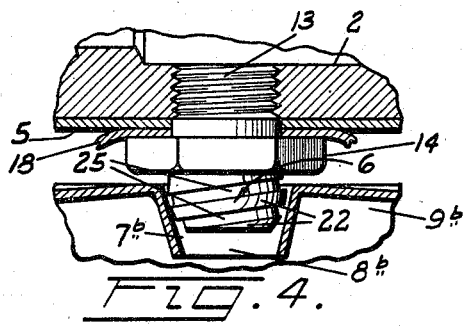

This simple yet highly effective arrangement of the inclined spherical surfaced zones 22 effectively precludes the use of such a cartridge as illustrated in either Figs. 3 or 4 with the cartridge connector stud described. The cartridge 9a of Fig. 3 has an outlet opening 8a formed by cutting a circular hole in the head 21a thereof and rolling a bead at the edge of the opening. Such a cartridge when pressed into engagement with the connector stud, regardless of the diameter of the opening 8a, will permit the escape of lubricant between the cartridge and the stud through one of the grooves 25. In Fig. 3 lubricant will be passed through the upper of the grooves 25 and the adjacent cartridge head structure. This condition is due to the fact that it is impossible for the wall of such an opening as illustrated in 8a to provide annular or continuous contact with any one of the spherical zones of contact 22 of the stud wall.

In Fig. 4 I have illustrated a cartridge 9b having an outlet opening 8b, the wall 7b of which is conical in contour thereby providing a continuous series of circular regions of contact, none of which may afford a circular or continuous line of contact with any one or more of the zones 22 of the cartridge connector stud. Such a combination as in the case of the cartridge 9a of Fig. 3 must result in the leakage of lubricant between the walls of the outlet opening and the cartridge connector stud.

It is thus apparent that a lubricant gun, dispenser, or other lubricating apparatus equipped with a cartridge connector stud as illustrated in Figs. 1 and 2 must employ, as an interchangeable source of lubricant supply, a cartridge having an outlet wall 7 which coincides with the spherical contour of the grooved outer wall of the connector stud and that attempts to employ cartridges other than those intended for use with the gun, dispenser or device having a stud, as defined, must fail as a matter of course.

Figure 5:
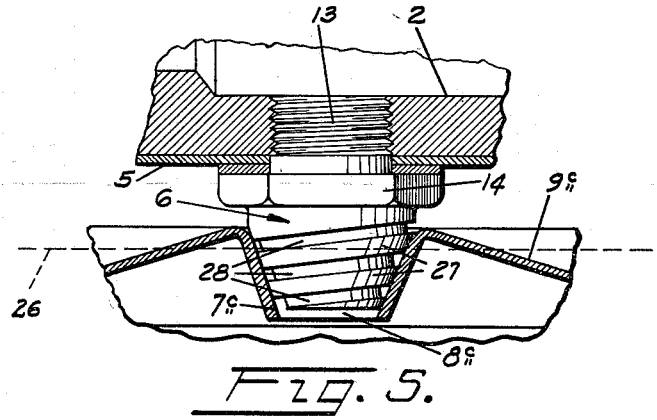

In Fig. 5 I have illustrated another form of the cartridge connector stud wherein the outer wall of the head is conical in shape and is divided into a plurality of elliptical zones of contact 27 by a plurality of grooves 28 formed in the outer conical wall of the stud about axes which are inclined with respect to the longitudinal axis of the stud at an angle of substantially eight and one-half degrees. The stud of Fig. 5 is intended for use with a cartridge 9c having an outlet opening 8c, the wall of which is conical as illustrated at 7c to coincide with the outermost surfaces of the head of the stud. As in the case of the connector stud of Figs. 1 and 2, the cartridge of Fig. 5 alone may be used as a source of lubricant supply therefor, neither of the cartridges of Figs. 2 or 3 being adaptable for use therewith because of failure to provide close contact throughout three hundred and sixty degrees of at least one of the cartridge engaging contact surfaces 27.

Figure 6:
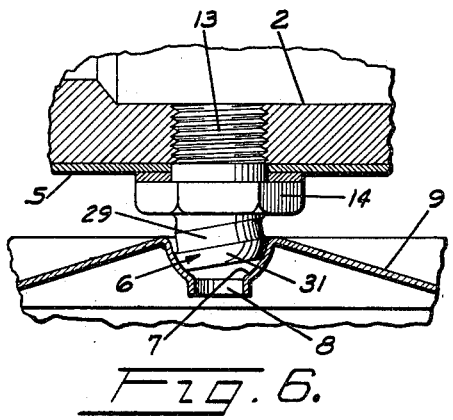
Figure 7:
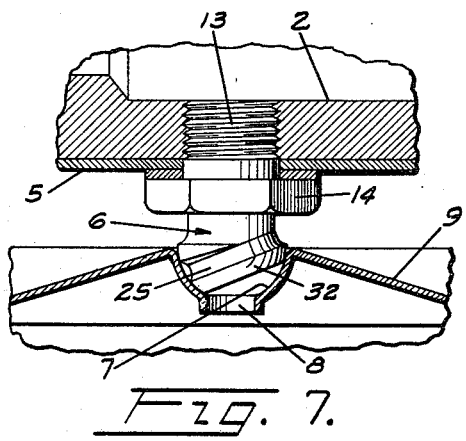

In Figs. 6 and 7 I have illustrated other forms of the cartridge connector stud of a type similar in nature to that illustrated in Figs. 1 and 2 inasmuch as both are intended for use with a cartridge having a spherical inlet opening wall as shown at 7. In the connector stud of Fig. 6, the stud may be initially formed with an elongated neck portion 29 separating the flanged portion 14 from the spherical surfaced head 31, the surface of the head 31 being defined by the zone of a sphere. The neck 29 is then bent away from the longitudinal axis of the stud at an inclination of substantially ten degrees therefrom thereby to cause the zone of spherical contact of the head 31 to lie in substantially the same position as one of the zones 22 of the stud of Figs. 1 and 2.

In Fig. 7 a cartridge connector stud is illustrated which differs from the stud of Fig. 2 in that the spherical head of the stud is truncated at 32 in a plane parallel with the groove 25 thereby to provide the combined structural contours of the studs of Figs. 2 and 6.

While I have herein illustrated and described certain forms of the cartridge connector stud wherein the general surface contour of the head of the stud is spherical or conical, it will be apparent that the general form of the head prior to the formation of the grooves or indentations therein may take other forms provided an area of uninterrupted contact exists between the stud and cartridge wall entirely about the axis of the stud prior to the provision of the grooves or depressions therein.

It is to be understood that the above described embodiments of the invention are for the purpose of illustration only, and various changes may be made therein without departing from the spirit and scope of the invention.

I claim:

1. A cartridge connector stud for establishing a fluid connection between a fluid dispensing device and an apertured fluid-containing cartridge, said stud having a contact surface for engagement with the wall of said cartridge surrounding the aperture thereof and having a plurality of annular grooves dividing said contact surface into a plurality of separated surfaces said grooves lying in planes at angles less than right angles to the axis of the stud.

2. A cartridge connector stud for establishing a fluid connection between a fluid dispensing device and an apertured fluid-containing cartridge, said stud having a contact surface for engagement with the wall of said cartridge surrounding the aperture thereof and having a plurality of annular grooves dividing said contact surface into a plurality of separated surfaces each of which encompasses the longitudinal axis of the connector stud, the medial planes of said surfaces lying at angles to the axis of the stud.

3. A cartridge connector stud for establishing a fluid connection between a fluid dispensing device and an apertured fluid-containing cartridge, said stud having a spherical contact surface for engagement with the wall of said cartridge surrounding the aperture thereof and having a plurality of annular grooves dividing said contact surface into a plurality of spherical zones.

4. A cartridge connector stud for establishing a fluid connection between a fluid dispensing device and an apertured fluid-containing cartridge, said stud having a spherical contact surface for engagement with the wall of said cartridge surrounding the aperture thereof and having a plurality of annular grooves dividing said contact surface into a plurality of spherical zones, said grooves lying in planes inclined with respect to the longitudinal axis of the stud between an angle of ninety degrees and an angle of one hundred and eighty degrees.

5. A cartridge connector stud for establishing a fluid connection between a fluid dispensing device and an apertured fluid-containing cartridge, said stud having a spherical contact surface for engagement with the wall of said cartridge surrounding the aperture thereof and having a plurality of grooves dividing said contact surface into a plurality of spherical surfaced zones inclined with respect to the longitudinal axis of the stud, the angle of inclination of said zones being such that a plane normal to said axis, intercepting one of the zones, must also intercept at least one of said grooves.

6. A cartridge connector stud for establishing a fluid connection between a fluid dispensing device and an apertured fluid-containing cartridge, said stud having a spherical surfaced zone of contact encompassing the longitudinal axis thereof for sealing engagement with the wall of said cartridge surrounding the aperture thereof, the medial plane of said zone of contact being inclined relative to said axis at an angle, said stud being truncated at its outer end in a plane parallel to said inclined zone of contact.

7. A cartridge connector stud for establishing a fluid tight connection between a fluid dispensing device and a cartridge having an aperture defined by a wall portion of substantial area, said stud having a contact surface for engagement with said wall portion over a substantial area and having an annular groove inclined to the axis of the stud and lying wholly within said contact surface.

8. A cartridge connector stud for establishing a fluid tight connection between a fluid dispensing device and a cartridge having an aperture defined by a wall portion of substantial area, said stud having a relatively narrow annular contact surface defined by relatively depressed surfaces on opposite sides thereof with the mean plane of said surface inclined to the axis of the stud for sealingly contacting said wall portion.

9. A cartridge connector stud for establishing a fluid connection between a fluid dispensing device and an apertured fluid containing cartridge, said stud having a contact surface for engagement with the wall of said cartridge surrounding the aperture thereof and a groove in said contact surface, said groove being so arranged that a plane normal to the axis of the stud intercepting said surface must also intercept the groove.

10. A cartridge connector stud for establishing a fluid connection between a fluid dispensing device and an apertured fluid containing cartridge, said stud having a contact surface for engagement with the wall of said cartridge surrounding the aperture thereof and a plurality of separate grooves in said surface so arranged that a plane normal to the axis of the stud intercepting said surface must also intercept one of said grooves.

11. A cartridge connector stud for establishing a fluid tight connection between a fluid dispensing device and a cartridge having an aperture defined by a wall portion of substantial area, said stud having an inlet opening surrounded by a contact surface for sealing engagement with said wall portion over a substantial area and having a groove lying wholly within the confines of said contact surface, the surface of said groove being spaced from and out of contact with said wall portion.

HARRY R. TEAR.